Dec. 20, 1966   J. BAUDE   3,293,530
ELECTRICAL POWER CONVERSION SYSTEM HAVING OUTPUT CONTROL MEANS
Filed Oct. 3, 1963   2 Sheets-Sheet 1

Inventor
John Baude
By R J Fachowski
Attorney

Dec. 20, 1966    J. BAUDE    3,293,530
ELECTRICAL POWER CONVERSION SYSTEM HAVING OUTPUT CONTROL MEANS
Filed Oct. 3, 1963    2 Sheets-Sheet 2 a b c d

Inventor
John Baude
By Balkowski
Attorney

United States Patent Office 3,293,530
Patented Dec. 20, 1966

3,293,530
ELECTRICAL POWER CONVERSION SYSTEM HAVING OUTPUT CONTROL MEANS
John Baude, Milwaukee, Wis., assignor to Allis-Chalmers Manufacturing Company, Milwaukee, Wis.
Filed Oct. 3, 1963, Ser. No. 313,550
12 Claims. (Cl. 321—8)

This invention relates to electrical power conversion systems that convert electrical energy from one form to another, particularly to such systems that have means for controlling the output level of the conversion system.

Electrical conversion systems are systems that convert electrical energy from one form to another. Conversion of direct current from one voltage to another, alternating current from one frequency to another, alternating current to direct current, and direct current to alternating current are examples of functions of electrical conversion systems. One of the problems inherent in such systems is that in some applications the output level excessively fluctuates in response to changes in load conditions or in response to changes in the source voltage. In many applications it is therefore necessary to provide means to control the output to maintain a predetermined minimum level.

With this invention, a system is provided for maintaining a minimum voltage. While the invention can be used with any type of power conversion system, it is particularly effective and advantageous for systems that convert direct current to alternating current. These systems are generally known as inverter systems.

While this invention can be used effectively with various types of converter systems, it is particularly adaptable for inverter systems. Therefore, description of the invention is generally limited to a description of embodiments of inverter systems. As used herein, "converter" is a device for producing one type of electrical energy from another and "inverter" is a particular type of converter that produces alternating current from direct current.

There are several known inverter systems that have means for controlling the output level. These include systems that use a harmonic suppressing regulating transformer providing regulated alternating current output from a silicon controlled rectifier that is used in an inverter for delivering square wave outputs; systems that use a variable frequency and variable duty cycle type chopped direct current regulator that controls the direct current supply to the inverter; and systems that use a saturable reactor in the output circuit of the inverter to control the load voltage. These systems are relatively expensive, relatively slow in response, or relatively inefficient compared to a system according to this invention.

A power conversion system, especially an inverter system, according to this invention accomplishes control of the output level through voltage regulation with relatively high efficiency, speed, accuracy and low cost.

The objects of this invention are: to provide a new and improved electrical power conversion system, to provide a new and improved inverter system having output regulation, to provide an inverter system having output regulation that is relatively inexpensive with relatively high efficiency and fast response time.

These and other objects and advantages will appear from the following detailed description:

Figure 1:
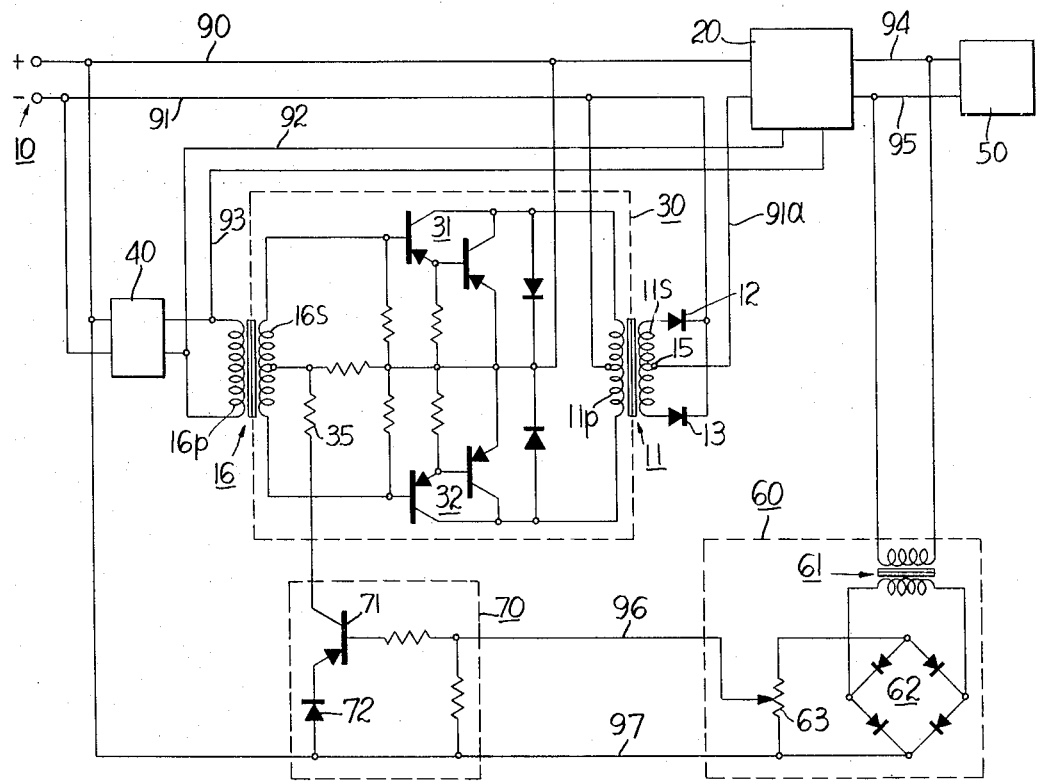
FIG. 1 is a drawing of an embodiment of an inverter system according to this invention.

Referring to FIG. 1, a source of electrical power such as a direct current source 10 supplies power to an electrical power converter such as a power inverter 20, to an auxiliary inverter 30, and to an oscillator 40. The power inverter produces an alternating current output for a load 50, the auxiliary inverter produces an output for the power inverter input and the oscillator produces an oscillating reference signal for the power inverter and the auxiliary inverter. A voltage sensing circuit 60 is connected to produce an output signal responsive to the output level of power inverter 20. A control circuit 70 responds to the output signal from the voltage sensing circuit to control the output level of auxiliary inverter 30.

Referring to FIG. 1 more particularly, direct current source 10 is connected to power inverter 20, auxiliary inverter 30, and oscillator 40 along conductors 90 and 91. Source 10 is connected to power inverter 20 along conductor 91 through an output winding 11s of an output transformer 11 that is coupled to auxiliary inverter 30 to receive the output of auxiliary inverter 30. The current path from source 10 to power inverter 20 is through conductor 91, diodes 12 and 13, each half of winding 11s to a center tap 15 on winding 11s, to the power inverter along a conductor 91a, and back to source 10 along conductor 90.

Oscillator 40 produces a reference output for controlling the frequency and phasing of the two inverters and delivers the reference output to the inverters along conductors 92 and 93. The oscillator signal is received by auxiliary through an input transformer 16 having a primary winding 16p and a secondary winding 16s.

The incoming oscillating signal to auxiliary inverter 30 cyclically biases transistor amplifiers 31 and 32 to produce an alternating current (sinusoidal in this embodiment) at a winding 11p which induces an output in a secondary winding 11s.

The alternating current output appearing at winding 11s is rectified by winding 11s and diodes 12 and 13. This output is delivered to the power inverter as a pulsing unidirectional current delivered to power inverter 20 and effectively increases the input voltage to power inverter 20.

Figure 4:
FIG. 4 is a drawing of wave forms occurring in the various circuits of the embodiments of FIGS. 1 and 3.
Figure 4:
Figure 4:
Figure 4:
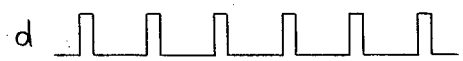

The ripple appearing in the unidirectional current does not distort the power converter output because it is substantially in phase with the power inverter output wave shape. Referring to FIG. 4, FIG. 4a shows an example of the output from transformer winding 11s that is delivered to the power inverter when the auxiliary inverter of FIG. 1 is controlled to produce a maximum output. This pulsating output is added to the voltage of the D.C. source and effectively increases the voltage received by the power inverter as a function of the output level of the auxiliary inverter.

FIG. 4b shows the output appearing at transformer winding 11s if auxiliary inverter 30 is controlled to produce somewhat less than maximum output. This output is varied as necessary to maintain the required output voltage from power inverter 20. While this less than maximum output produces some distortion in the power inverter output it is not significant in most applications.

The alternating current output from power inverter 20 is delivered along conductors 94 and 95 to the load and to voltage sensing circuit 60. Voltage sensing circuit 60 comprises a transformer 61 for coupling the output voltage of power inverter 20 to a rectifying bridge 62. Rectifying bridge 62 produces a rectified output voltage proportional to the output voltage of power inverter 20 across a potentiometer 63. A measure of the output signal from voltage sensing circuit 60 is delivered along conductors 96 and 97 to control circuit 70. The potentiometer can be adjusted to control the level of operation of control circuit 70.

Control circuit 70 has a transistor 71 that is biased and selected to be conductive when the output from voltage sensing circuit 60 is below a predetermined level and decreases in conductance as the output level decreases. With transistor 71 conducting, the positive potential of direct current source 10 is conducted along conductor 90 through a diode 72, the emitter-collector circuit of transistor 71, and a resistor 35 to place a positive potential on the center tap of transformer winding 16s. By making this center tap point sufficiently positive, transistor groups 31 and 32 are reverse biased so that they are not turned on or are turned on for only a portion of a cycle by the oscillating input signal appearing at winding 16s. The auxiliary inverter then does not produce any output or produces a less than maximum output.

As the output of the power inverter drops, the output of voltage sensing circuit 60 also drops and, depending on the biasing of transistor 71 and the adjustment of potentiometer 63, transistor 71 is made proportionally less conductive. As transistor 71 becomes less conductive, the center tap of transformer winding 16s becomes proportionally less positive as a function of the difference of the power inverter output voltage and the predetermined voltage selected. The positive bias of the center tap proportionally turns off control circuit 70 to proportionally turn on the auxiliary inverter.

The components are selected and adjusted so that the potential at the center tap of transformer winding 16s keeps transistor groups 31 and 32 reverse biased sufficiently to keep them turned off throughout the entire cycle when the power inverter output is at or above a predetermined voltage. As the power inverter voltage drops below the predetermined voltage, transistor groups 31 and 32 are proportionally less reverse biased to turn on only during a portion of the sinusoidal input from oscillator 40 to produce the auxiliary output of the general form shown in FIG. 4b. As transistor groups 31 and 32 become less reverse biased the auxiliary inverter output voltage proportionally increases.

In this manner, the output voltage of auxiliary inverter 30 is responsive to the output voltage of power inverter 20 and varies as an inverse function of, or is inversely proportional to, the power inverter output voltage. The system responds to any drop in the output voltage of the power inverter whether it is a result of changed load conditions or decreased direct current voltage.

In some applications it may be desirable to filter the rectified output from rectifying bridge 62 to eliminate any ripple effect. In the usual application, however, since the control circuit responds to the instantaneous voltage that appears across potentiometer 63, the application of the ripple signal is substantially in phase with the desired output from auxiliary inverter 30 so that the increase of D.C. input, while fluctuating, is in phase with the power inverter output and furnishes additional input voltage at the time in the cycle that it is required. However, this adds a slight amount of harmonic distortion when less than the maximum output is produced by the auxiliary inverter because the sinusoidal voltage is not applied over the entire range of the half cycle. This harmonic distortion is allowable in most applications. If the distortion is not allowable, the auxiliary inverter can be designed according to FIG. 2 to filter the auxiliary inverter output.

Figure 2:
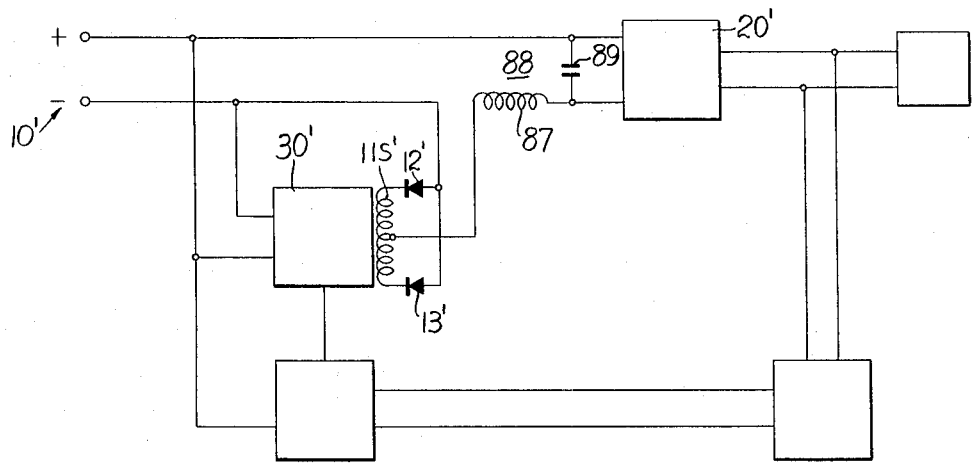
FIG. 2 is a block diagram of another embodiment of a system according to this invention.

Referring to FIG. 2, wherein like components are given numbers similar to FIG. 1, a direct current source 10' supplies power to a power inverter 20' through a transformer winding 11s' and diodes 12' and 13' as in FIG. 1. In this embodiment, an auxiliary inverter 30' and power inverter 20' may produce outputs of different frequencies and each inverter may contain its own oscillating reference signal device. For example, power inverter 20' could produce a 60 cycle per second output while auxiliary inverter 30' could produce a 400 cycle per second output. The output appearing at winding 11s' is rectified, as in the embodiment of FIG. 1, and is supplied to power inverter 20'. Because of the higher frequency of the auxiliary inverter output, the ripple effect is very small and this may be practically eliminated by the addition of a filter system such as filter network 88 which comprises a coil 87 and a capacitor 89.

The remainder of the circuitry essentially functions as the remainder of the circuitry in FIG. 1.

In some applications, generally according to FIG. 1, there may be an undesirable phase shift created in the system between the power inverter output voltage and the auxiliary inverter output voltage. This may be compensated for by introducing a means for shifting the phase of the control circuit as shown in FIG. 3.

Also, auxiliary inverter 30 may be designed to produce a square wave output instead of the sinusoidal output of the auxiliary inverter of FIG. 1. A square wave output at transformer winding 11s is often preferable because of its higher efficiency. An embodiment that produces a square wave output is shown in FIG. 3. In describing FIG. 3, portions of the circuitry similar to that shown in FIG. 1 are designated by similar reference characters.

Figure 3:
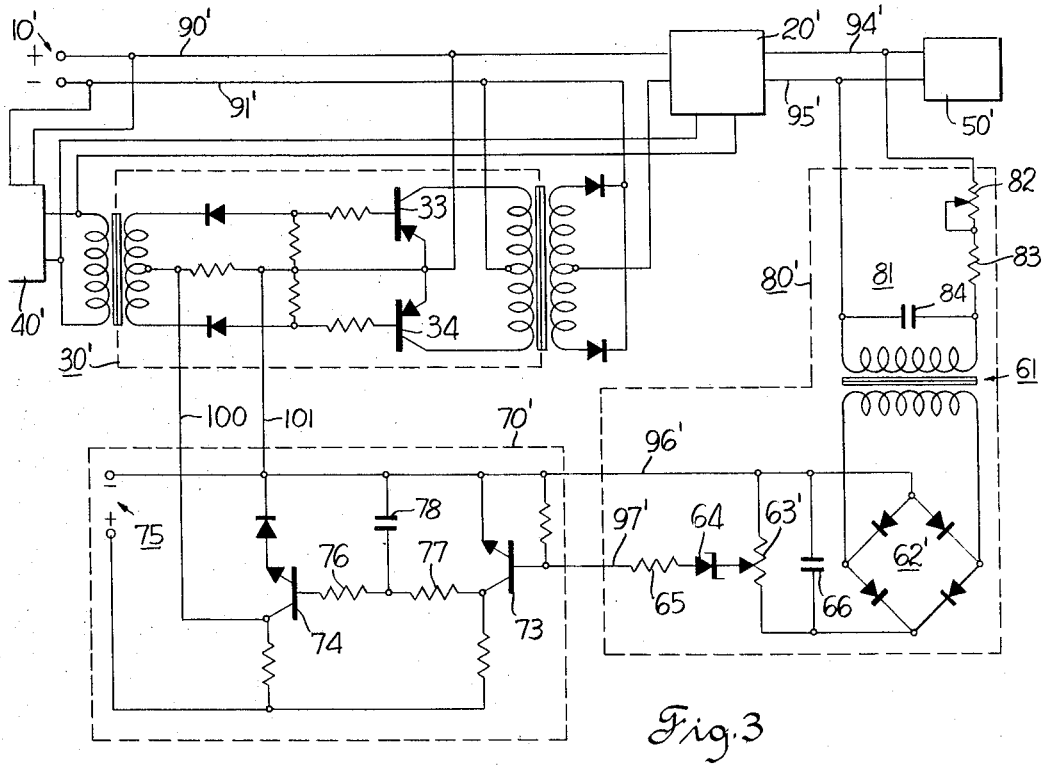
FIG. 3 is a drawing of another embodiment of an inverter system according to this invention.

Referring to FIG. 3 a D.C. source 10' supplies D.C. power along conductors 90' and 91' to a power inverter 20' and an auxiliary inverter 30'. Power inverter 20' produces an alternating current output along conductors 94' and 95' to a load 50' and to a voltage sensing and phase shifting circuit 80'. Voltage sensing and phase shifting circuit 80' produces an output along conductors 96' and 97' to a control circuit 70'. Control circuit 70' controls auxiliary inverter 30' along conductors 100 and 101 in a manner similar to that of the embodiment shown in FIG. 1.

An oscillator 40' controls the frequency of auxiliary inverter 30' and power inverter 20' in the same manner as in FIG. 1.

To insure that the output of auxiliary inverter 30' is in phase with the output of power inverter 20' if required, circuit 80' contains a phase shifting network 81 that comprises a potentiometer 82, resistor 83 and a capacitor 84. Potentiometer 82 is adjustable to vary the phase shift of the alternating current input as necessary to compensate for phase shifts occurring in the subsequent circuitry that controls auxiliary inverter 30'.

The output from power inverter 20', after the phase shift correction has been introduced, is coupled to a rectifier bridge 62' through a transformer 61'. The unidirectional output from rectifying bridge 62' appears across a potentiometer 63' and the voltage selected by the adjustment of the tap of the potentiometer controls circuit 70' through a zener diode 64 and a resistor 65. A capacitor 66 is optional but may be used to reduce the ripple of the output of rectifier bridge 62.

When the output of circuit 80, along conductors 96' and 97', exceeds the zener breakdown voltage of zener diode 64, a positive potential that measures the output voltage of power inverter 20' is applied to the base of a transistor 73 through an RC network of resistors 76 and 77 and a capacitor 78. This makes transistor 73 conductive proportionally to the positive potential applied to its base and proportionally connects the base of a transistor 74 to the positive potential of a D.C. source 75. This increases the conductance of transistor 74 in proportion to the potential applied to the base of transistor 73. The positive potential of D.C. source 75 is therefore varyingly supplied to reverse bias transistors 33 and 34 to keep them nonconductive when the voltage of the power inverter output is above a predetermined level (selected by adjustment of potentiometer 63' and selection of zener diode 64). At voltage levels lower than the predetermined level, the reverse biasing keeps transistors 33 and 34 off only during a part of the cycle (controlled by oscillator 40') and the transistors conduct during part of the cycle to increase the input to the power converter similarly to that of FIG. 1.

As the output voltage of power inverter 20' decreases, the square wave output of 30' is turned on for increasing portions of the cycle in proportion to the decrease of voltage below the predetermined output voltage of power inverter 20'. If the output voltage of power inverter 20' decreases to the point where the voltage across zener diode 64 is below the zener breakdown voltage, auxiliary inverter 30' produces an output for the full half cycle.

FIG. 4d shows an example of the wave form produced by auxiliary inverter 30' when the auxiliary inverter is partially turned on and FIG. 4c shows the wave form produced by auxiliary inverter 30' when the auxiliary inverter is producing its maximum output to furnish the maximum input to power inverter 20'.

In describing the invention, the preferred embodiment has been shown and described, but it is obvious to one skilled in the art that there are many variations, combinations and alterations that can be made without departing from the spirit and scope of the invention.

The embodiments of the invention in which an exclusive property or privilege is claimed are defined as follows:

1. A system for controlling the output voltage of an electrical power converter comprising:
   a source of electrical energy,
   auxiliary means powered by energy from the source for producing a unidirectional electrical output,
   a power converter powered by energy from the source and by the auxiliary means output for producing an output for a load, and
   means connected to control the auxiliary means and connected to receive the power converter output for making the auxiliary means operative when the converter output voltage is less than a predetermined voltage and for cyclically varying the auxiliary means output voltage substantially in phase with the power converter output voltage as a function of the difference between the power converter output voltage and said predetermined voltage.

2. A system for controlling the output voltage of an electrical power inverter comprising:
   a source of direct current,
   auxiliary means powered by the direct current source for producing a unidirectional electrical output,
   a power inverter powered by direct current from the source and by the auxiliary means electrical output for producing an output for a load, and
   means connected to control the auxiliary means and connected to receive the power inverter output for making the auxiliary means operative when the inverter output voltage is less than a predetermined voltage and for cyclically varying the auxiliary means output voltage substantially in phase with the power inverter output voltage as a function of the difference between the power inverter output voltage and said predetermined voltage.

3. A system for controlling the output of an electrical power inverter comprising:
   a source of direct current,
   an auxiliary inverter powered by the direct current source for producing an alternating output,
   means connected to rectify the auxiliary inverter output for producing a unidirectional output,
   a power inverter powered by the direct current source and by the unidirectional output for producing an alternating current output for a load, and
   means connected to control the auxiliary inverter and connected to receive the power inverter output for controlling the auxiliary inverter output level in response to the power inverter output level.

4. A system for controlling the output of an electrical power inverter comprising:
   a direct current source,
   an auxiliary inverter powered by the direct current source for producing an alternating current output,
   means connected to rectify the auxiliary inverter output for producing a unidirectional output,
   a power inverter connected to be powered by the direct current source and the unidirectional output for producing an alternating current output for a load,
   voltage sensing means connected to receive the power inverter output for producing a signal varying as a function of said power inverter output, and
   control means connected to receive the signal and connected to control the auxiliary inverter for controlling the auxiliary inverter output in response to the level of said signal.

5. A system for maintaining a predetermined output voltage of an electrical power inverter comprising:
   a direct current source,
   an auxiliary inverter powered by the direct current source for producing an alternating output,
   means connected to rectify the auxiliary inverter output for producing a unidirectional output,
   a power inverter connected to be powered by the direct current source and by the unidirectional output for producing an alternating current output for a load,
   voltage sensing means connected to receive the power inverter output for producing a signal varying as a function of said power inverter output, and
   control means connected to receive the signal and connected to control the auxiliary inverter for turning on the auxiliary inverter when said signal is less than a predetermined level and for varying the auxiliary inverter output as an inverse function of the level of said signal.

6. A system for controlling the output voltage of an electrical power inverter comprising:
   a direct current source,
   an auxiliary inverter powered by the direct current source for producing an alternating output,
   means connected to rectify the auxiliary inverter output for producing a unidirectional output,
   a power inverter connected to be powered by direct current source and the unidirectional output for producing an alternating current output for a load,
   voltage sensing means connected to receive the power inverter output for producing a voltage signal proportional to said power inverter output voltage, and
   control means connected to receive the signal voltage and connected to control the auxiliary inverter for turning on the auxiliary inverter when said signal output is less than a predetermined voltage and for varying the auxiliary inverter output voltage as a function of the difference between said signal voltage and said predetermined voltage.

7. A system for controlling the output voltage of a power inverter comprising:
   a direct current source,
   a power inverter powered by an input for producing alternating current for a load,
   an auxiliary inverter powered by the direct current source for producing an alternating current output,
   means connected to the auxiliary inverter to rectify the auxiliary inverter output to produce a unidirectional output, said input comprising the direct current source and the rectified output,
   an oscillator connected to the auxiliary inverter and the power inverter for controlling the frequency of the power inverter output and the auxiliary inverter output,
   sensing means connected to receive the power inverter output for producing a signal proportional to the voltage of said power inverter output, and
   means connected to control the auxiliary inverter and connected to receive the sensing means signal for controlling the voltage of the auxiliary inverter output in response to the level of said signal.

8. A system for controlling the output voltage of a power inverter comprising:
  a direct current source,
  a power inverter powered by an input for producing alternating current for a load,
  an auxiliary inverter powered by the direct current source for producing an alternating current output,
  means connected to the auxiliary inverter to rectify the auxiliary inverter output to produce a unidirectional output,
  said power inverter connected to receive direct current from the direct current source and the unidirectional output as an input,
  an oscillator connected to the auxiliary inverter and the power inverter for controlling said inverter to maintain the frequency and phasing of the auxiliary inverter output substantially the same as the frequency and phasing of the power inverter output,
  sensing means connected to receive the power inverter output for producing a signal proportional to the voltage of said power inverter output, and
  means connected to control the auxiliary inverter and connected to receive the sensing means signal for controlling the voltage of the auxiliary inverter output in response to the level of said signal.

9. A system for controlling the output voltage of a power inverter comprising:
  a direct current source,
  a power inverter powered by an input for producing alternating current for a load,
  an auxiliary inverter powered by the direct current source for producing an alternating current output,
  means connected to the auxiliary inverter to rectify the auxiliary inverter output to produce a unidirectional output,
  said power inverter connected to receive direct current from the direct current source and the unidirectional output as an input,
  an oscillator connected to the auxiliary inverter and the power inverter for controlling said inverters to maintain the frequency and phasing of the auxiliary inverter output and the power inverter output substantially equal to each other,
  sensing means connected to receive the power inverter output for producing a unidirectional signal varying as a function of the voltage of said power inverter output, and
  means connected to control the auxiliary inverter and connected to receive the sensing signal for turning the auxiliary inverter on and off and for controlling the voltage of the auxiliary inverter output in response to the level of said signal.

10. A system for controlling the output voltage of a power inverter comprising:
  a direct current source,
  a power inverter powered by an input for producing alternating current for a load,
  an auxiliary inverter powered by the direct current source for producing an alternating current output,
  means connected to the auxiliary inverter to rectify the auxiliary inverter output to produce a unidirectional output,
  said power inverter connected to receive direct current from the direct current source and the unidirectional output as an input,
  an oscillator connected to the auxiliary inverter and the power inverter for controlling said inverters to produce inverter outputs of the same frequency in phase with each other,
  sensing means connected to receive the power inverter output for producing a unidirectional voltage varying as a function of the voltage of said power inverter output, and
  means connected to control the auxiliary inverter and connected to receive the sensing means voltage for effecting operation of the auxiliary inverter when said sensing means voltage is less than a predetermined minimum and for varying the voltage of the auxiliary inverter output in proportion to the difference between said sensing means voltage and said predetermined minimum voltage.

11. A system for controlling the output voltage of a power inverter comprising:
  a direct current source,
  a power inverter powered by an input for producing alternating current for a load,
  an auxiliary inverter powered by the direct current source for producing an alternating current output having a frequency substantially higher than the frequency of the alternating current produced by the power inverter,
  rectifying means connected to rectify and filter the auxiliary inverter output to produce a unidirectional output,
  said power inverter connected to receive direct current from the direct current source and the rectifying means output in series as an input,
  sensing means connected to receive the power inverter output for rectifying and filtering said power inverter output to produce a direct current output having a voltage proportional to the voltage of the power inverter output, and
  means connected to control the auxiliary inverter and connected to receive the sensing means output for turning on the auxiliary inverter when said sensing means output is less than a predetermined minimum voltage and for controlling the auxiliary inverter when turned on to produce an auxiliary inverter output voltage proportional to the difference between the sensing means output voltage and said predetermined minimum voltage.

12. A system for controlling the output voltage of a power inverter comprising:
  a power inverter for producing alternating current for a load,
  an auxiliary inverter for producing an alternating current output,
  a direct current source having two terminals,
  transformer winding having two ends and a center tap connection coupled to the auxiliary inverter to receive the auxiliary inverter output,
  an oscillator connected to the power inverter and the auxiliary inverter for synchronizing the phasing and controlling the frequency of the inverter outputs,
  said power inverter connected to receive direct current from the direct current source with one terminal of the direct current source connected to the power inverter and the other terminal of the direct current source connected to the transformer winding end connections and the center tap connection of the transformer winding connected to the power inverter,
  diodes connected between each of the transformer end connections and said other direct current source terminal and connected to conduct direct current from the direct current source to the power inverter and connected to rectify the auxiliary inverter output,
  sensing means connected to receive the power inverter output for producing a rectified signal proportional to the power inverter output voltage, and
  a transistor connected to the auxiliary inverter and connected to receive the sensing means signal for turning off the auxiliary inverter when said signal exceeds a predetermined voltage and for controlling the auxiliary inverter when said signal voltage is less than said predetermined voltage to produce an auxiliary inverter output varying as a function of the difference between the signal voltage and said predetermined voltage.

References Cited by the Examiner

UNITED STATES PATENTS 3,197,691  7/1965  Gilbert _____ 321—18

OTHER REFERENCES

IBM Technical Disclosure Bulletin, vol. 3, No. 6, p. 48, November 1960.

JOHN F. COUCH, *Primary Examiner.*

W. H. BEHA, *Assistant Examiner.*